UNITED STATES PATENT OFFICE.

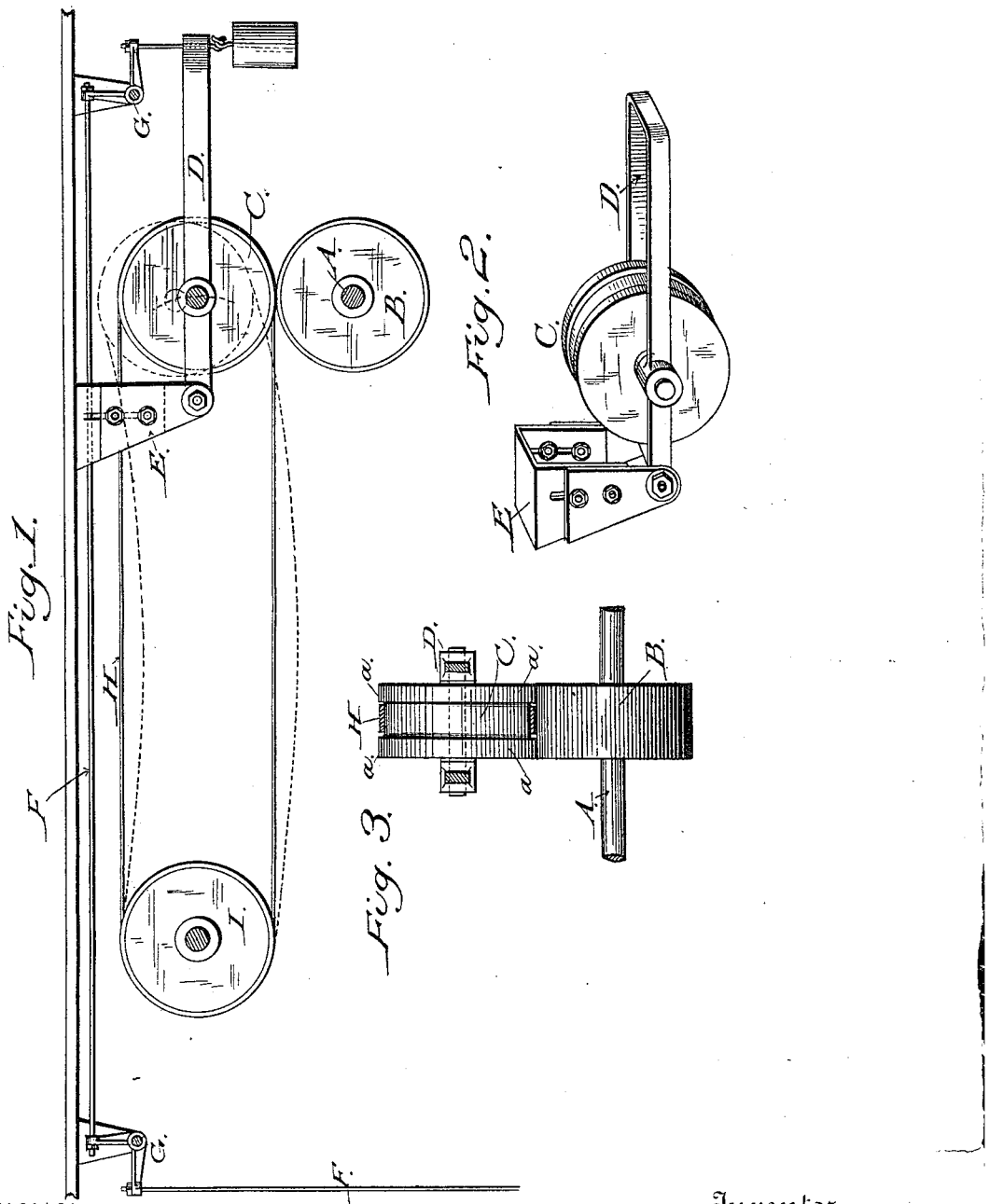

WILLIAM REESE HAVENS, OF DENVER, COLORADO.

FRICTIONAL GEAR FOR TRANSMISSION OF POWER.

SPECIFICATION forming part of Letters Patent No. 362,743, dated May 10, 1887.

Application filed February 23, 1887. Serial No. 228,525. (No model.)

*To all whom it may concern:*

Be it known that I, WILLIAM REESE HAVENS, a citizen of the United States, and residing at Denver, in the county of Arapahoe, State of Colorado, have invented certain new and useful Improvements in Friction-Gear for Transmission of Power, of which the following is a clear, full, and exact description, reference being had to the accompanying drawings, making a part of this specification, in which—

Figure 1 is a vertical section of a line of shafting with my improvements attached. Fig. 2 is a perspective view showing swinging frame, hanger, and friction-pulley attached. Fig. 3 is a rear view of Fig. 1.

My present invention relates to means for starting and stopping machinery without the use of loose pulley or shifting belt; and it consists in the combination and arrangement of devices, hereinafter described and claimed.

To enable others skilled in the art to make and use my invention, I will proceed to describe the exact manner in which I have carried it out.

In the drawings, A represents the line-shaft carrying the driving-pulley B. Above the driving-pulley B is suspended in any convenient and suitable manner the friction-pulley C, so it can be readily raised from or dropped into contact with the pulley B. To accomplish this, I have shown the pulley C journaled in a swinging frame, D, the frame being pivoted to the adjustable hanger E, the free end of the frame being controlled by the rod F, provided with the bell-cranks G. It is evident that by pulling down on the rod F the friction-pulley C will be raised out of contact with the driving-pulley B, and it is also evident that when the rod F is released the pulley C will drop into contact with the pulley B, thereby starting the friction-pulley C in motion, which, through the belt H, in turn starts the counter-shaft pulley I and sets the machinery in motion.

When it is desired to stop the machinery and have it at rest, it is only necessary to pull down on rod F and raise the friction-pulley C from contact with the driving-pulley, and the machinery is at rest and the belt H relaxed, as shown in dotted lines, without the intervention and annoyance of a loose pulley or moving belt, as now used to accomplish the same result. The rod F can be controlled by a lever or any suitable mechanism.

The advantages I claim are a relaxed belt and the absence of all noise and all wear when the machinery to be driven is at rest; also, a more instant starting and stopping of the machinery than can possibly be done by the old means of a shifting belt.

In constructing the friction-pulley C, I take an ordinary pulley of twice the width of the belt it is to carry, and around each edge of this pulley I put a band, a, of leather or other friction material, of sufficient thickness to allow the belt H to pass freely around the pulley without touching the driving-pulley B when the two pulleys are in contact. The bands of leather are narrow enough to give the belt H sufficient room sidewise, or the pulley may be constructed in any other manner that will attain this result.

It is evident that the positions of the pulleys B and C can be reversed, placing the friction-pulley on the line-shaft without departing from the spirit of my invention.

Having thus explained my invention, what I claim as new, and desire to secure by Letters Patent, is—

The driving-pulley B, the belt H, the pulley I, the swinging frame D, and the friction-pulley C, mounted in said frame, in combination with the adjustable frame E, in the lower end of which one end of the frame D is mounted, a counter-balance at the opposite end of said frame, the bell-cranks G, and the rod F, for elevating said frame and friction-pulley, substantially as described.

WILLIAM REESE HAVENS.

Witnesses:
FRANZ CAZIN,
JOHN W. NESMITH.